US011267143B2

(12) United States Patent
Arizono

(10) Patent No.: US 11,267,143 B2
(45) Date of Patent: Mar. 8, 2022

(54) PORT STRUCTURE OF CONTAINMENT APPARATUS, KIT FOR CREATING PORT OF CONTAINMENT APPARATUS, AND CONTAINMENT APPARATUS

(71) Applicant: NARA MACHINERY CO., LTD., Tokyo (JP)

(72) Inventor: Kenichi Arizono, Tokyo (JP)

(73) Assignee: NARA MACHINERY CO., LTD., Tokyo (JP)

( * ) Notice: Subject to any disclaimer, the term of this patent is extended or adjusted under 35 U.S.C. 154(b) by 648 days.

(21) Appl. No.: 16/086,325

(22) PCT Filed: May 18, 2017

(86) PCT No.: PCT/JP2017/018756
§ 371 (c)(1),
(2) Date: Sep. 19, 2018

(87) PCT Pub. No.: WO2017/204091
PCT Pub. Date: Nov. 30, 2017

(65) Prior Publication Data
US 2019/0084166 A1 Mar. 21, 2019

(30) Foreign Application Priority Data
May 23, 2016 (JP) .............................. JP2016-102367

(51) Int. Cl.
*B25J 21/02* (2006.01)
*F16J 15/10* (2006.01)
(Continued)

(52) U.S. Cl.
CPC ................ *B25J 21/02* (2013.01); *B25J 1/08* (2013.01); *B25J 21/00* (2013.01); *F16J 15/061* (2013.01);
(Continued)

(58) Field of Classification Search
CPC ..... B25J 21/00; B25J 21/02; B25J 1/08; F16J 15/10; F16J 15/061; F16J 15/104; G21F 7/04
(Continued)

(56) References Cited

U.S. PATENT DOCUMENTS 3,051,963 A * 9/1962 Hallett, Jr. ............... B25J 21/02
285/39
3,323,846 A * 6/1967 Lawrence ............... B25J 21/02
312/1
(Continued)

FOREIGN PATENT DOCUMENTS

| JP | 2001-328093 A | 11/2001 |
| JP | 2005-246568 A | 9/2005 |
| JP | 2011-161607 A | 8/2011 |

OTHER PUBLICATIONS

International Search Report of the International Searching Authority dated Aug. 8, 2017 for the corresponding International application No. PCT/JP2017/018756 (and English translation).

*Primary Examiner* — James O Hansen
(74) *Attorney, Agent, or Firm* — Posz Law Group, PLC

(57) ABSTRACT

A port structure of a containment apparatus is capable of providing a highly reliable port by means of a structure with which a port can be formed in any size at any position and high airtightness thereof can be maintained. The port structure has: a port formation hole that is formed in a transparent synthetic resin sheet defining at least a part of a chamber; an inner ring member disposed on the inner surface side of the port formation hole; an outer ring member disposed on the outer surface side of the port formation hole; and a fastening member that joins the inner ring member and the outer ring member to each other while having a rim portion of the port formation hole held therebetween.

6 Claims, 14 Drawing Sheets

(51) Int. Cl.
  *B25J 1/08* (2006.01)
  *B25J 21/00* (2006.01)
  *G21F 7/04* (2006.01)
  *F16J 15/06* (2006.01)
  *A61G 10/00* (2006.01)

(52) U.S. Cl.
  CPC ............. *F16J 15/10* (2013.01); *F16J 15/104* (2013.01); *G21F 7/04* (2013.01); *A61G 10/005* (2013.01)

(58) Field of Classification Search
  USPC ........ 312/1, 3; 422/565; 454/56, 57; 600/21, 600/22
  See application file for complete search history.

(56) References Cited

U.S. PATENT DOCUMENTS

| | | | | |
|---|---|---|---|---|
| 3,475,808 A * | 11/1969 | Woolsey | ................. | G21F 7/053 29/402.08 |
| 4,010,588 A * | 3/1977 | Eisert | ...................... | B25J 21/02 52/204.593 |
| 4,123,123 A * | 10/1978 | Sato | ......................... | B25J 21/02 2/270 |
| 4,141,609 A * | 2/1979 | Eisert | ...................... | G21F 7/047 312/1 |
| 4,984,828 A * | 1/1991 | Lepissier | ................. | B25J 21/02 285/200 |
| 5,562,593 A * | 10/1996 | Sammel | ................. | B08B 15/02 588/261 |
| 5,662,581 A * | 9/1997 | Jennrich | ................. | B25J 21/02 312/1 |
| 7,780,248 B2 * | 8/2010 | Granadino | ............ | G01M 3/226 312/1 |
| 2002/0105251 A1* | 8/2002 | Kensey | .................... | B25J 21/02 312/1 |
| 2003/0137225 A1 | 7/2003 | Hauville | | |
| 2015/0022065 A1* | 1/2015 | Lemonds | ................ | E05C 7/002 312/1 |

\* cited by examiner

PORT STRUCTURE OF CONTAINMENT APPARATUS, KIT FOR CREATING PORT OF CONTAINMENT APPARATUS, AND CONTAINMENT APPARATUS

CROSS REFERENCE TO RELATED APPLICATIONS

This application is a U.S. national stage of International Patent Application No. PCT/JP2017/018756 filed on May 18, 2017 and is based on Japanese Patent Application No. 2016-102367 filed on May 23, 2016, the disclosures of which are incorporated herein by reference.

TECHNICAL FIELD

The present invention relates to a port structure of a containment apparatus, a kit for creating a port of a containment apparatus, and a containment apparatus.

BACKGROUND ART

The safety of workers needs to be ensured in handling highly active substances or toxic substances including active pharmaceutical drug substances, as well as hazardous materials such as radioactive materials. In so doing, devices for carrying out various types of processing on hazardous materials are contained in a space isolated from the outside world (the space can be called clean box, isolator, glove box, and the like, but in the present invention, the space is collectively referred to as containment in the sense that these various processing devices are contained therein) to execute operations on various processes ranging from weighing, subdividing, filling and analyzing to grinding, mixing, granulating and drying of the hazardous materials.

A typical containment apparatus has a structure in which a box-shaped chamber is supported by a frame-shaped stand on casters. The containment apparatus is movable by the casters (e.g., PTL 1).

In this containment apparatus disclosed in PTL 1, the both side surfaces, upper surface, and lower surface of the chamber, as well as the frame portion of the same that joins these surfaces, are basically composed of metal plates. Also, a transparent plate made out of tempered glass or plastic is fitted into the front surface (and, in some cases, the rear surface) so that the interior can be observed. Then, using various processing devices contained in this containment apparatus, the operations mentioned above are executed on hazardous materials. In order to execute the operations, arms are inserted in rubber or plastic gloves attached to cylindrical ports that are fixed to circular or oval openings formed by cutting the transparent plate.

Incidentally, in the typical containment apparatus described above, the positions for fixing the ports to the transparent plate, that is, the positions of the opening portions, are determined as follows.

Firstly, a wooden model of the same size, shape, and height as the actual chamber is created. On this wooden model, "mockup testing" is repeatedly performed in which the positions of the opening portions are frequently changed and verified while taking into consideration the position of a device to be placed in the chamber, the method of operating the device, the body shape of the worker, and the like. After verifying the appropriate positions by performing this "mockup testing," the actual containment apparatus (chamber) is designed.

Therefore, with this type of containment apparatus, determining the positions of the opening portions alone requires a considerable amount of money and time. Moreover, prior to assembling the containment apparatus, that is, prior to fitting the transparent plate to the chamber, hole formation needs to be carried out, and it is extremely difficult to change the holes that are already opened. For this reason, it is impossible to change the positions on site.

In order to solve the problems of the foregoing typical containment apparatus, the applicant of the present disclosure has first invented a port structural member of a containment apparatus and then filed the patent application.

According to this port structural member of a containment apparatus for which the patent application was filed, a port of any size can be formed inexpensively at any position. This structure is a port structural member of a containment apparatus that has a cylindrical member that is tightly fitted into an outer peripheral surface thereof, a rim of a port formation hole formed in a transparent soft synthetic resin sheet defining at least a part of a chamber, and another cylindrical member that is externally fitted to the foregoing cylindrical member in such a manner as to hold the rim of the port formation hole of the transparent soft synthetic resin sheet therebetween (PTL 2).

CITATION LIST

Patent Literature

[PTL 1] Japanese Patent Application Laid-open No. 2001-328093
[PTL 2] Japanese Patent Application Laid-open No. 2011-161607

SUMMARY OF INVENTION

Technical Problem

According to the port structural member disclosed in PTL 2, since a port is formed by forming the port formation hole in the transparent soft synthetic resin sheet and tightly fitting the cylindrical members to each other with the rim of the port formation hole therebetween, a port of any size can be formed at any position. In addition, a port can be formed anywhere even on site.

In the technique disclosed in PTL 2, however, due to the variations in thickness and slipperiness of the synthetic resin sheet that is used to define the chamber, simply fitting the cylindrical chambers to each other is not enough to ensure strong fixing power and therefore to maintain high airtightness. Moreover, the technique disclosed in PTL 2 raises a risk that the cylindrical members fitted to each other may become disengaged during an operation using the port, resulting in not being able to construct a highly reliable port.

More specifically, in the technique disclosed in PTL 2, the synthetic resin sheet is held in an L-shape between an inner surface (planar surface) of a flange extending radially outward to one end of the inner cylindrical member and one end surface of the outer cylindrical member that faces this inner surface, as well as between an outer peripheral surface of the inner cylindrical member and an inner peripheral surface of the outer cylindrical member facing the inner cylindrical member, and the distances between these opposing surfaces of the both members are made constant regardless of the thickness and material of the synthetic resin sheet. For this reason, in a case where the synthetic resin sheet is thick or hard, the synthetic resin sheet cannot easily be fit between the outer peripheral surface of the inner cylindrical member and the inner peripheral surface of the outer cylindrical member facing the inner cylindrical member, making it difficult to bring the cylindrical members into engagement with each other. In such a case, by forcibly fitting the members to each other, that is, by engaging a hook of the inner cylindrical member with a cutout of the outer cylindrical member to fit the members to each other, the members are not easily disengaged. However, if the members are fitted to each other with the synthetic resin sheet being displaced, the hook part might end up being damaged when disengaging the members. As a result, the port structural member cannot be reused. On the other hand, in a case where the synthetic resin sheet is thin, the members can easily be fitted to each other since the distances between the opposing surfaces of the members are made constant as described above. However, high airtightness cannot be maintained, as described above. Therefore, the technique disclosed in PTL 2 limits the thickness of the synthetic resin sheet to the range of 100 to 200 μm.

The present invention was contrived in view of the circumstances surrounding the foregoing background. An object of the present invention is to provide a highly reliable port by means of a structure capable of forming a port of any size at any position and maintaining high airtightness thereof, a port structure of a containment apparatus configured to achieve easy fitting and removal of members, a kit for creating a port of a containment apparatus, and a containment apparatus.

Solution to Problem

In order to achieve the foregoing object, the present invention is a port structure of a containment apparatus, a kit for creating a port of a containment apparatus, and a containment apparatus that are described in the following (1) to (8).

(1) A port structure of a containment apparatus, having: a port formation hole that is formed in a transparent synthetic resin sheet defining at least a part of a chamber; an inner ring member disposed on an inner surface side of the port formation hole; an outer ring member disposed on an outer surface side of the port formation hole; and a fastening member that joins the inner ring member and the outer ring member to each other while having a rim portion of the port formation hole held therebetween.

(2) The port structure of a containment apparatus according to (1) above, wherein a ring-shaped seal member is provided in each of holding surfaces of the inner ring member and the outer ring member.

(3) The port structure of a containment apparatus according to (1) above, wherein an insertion hole for inserting a screw configuring the fastening member is formed in the outer ring member, and the inner ring member is provided with a female screw into which the screw is threaded.

(4) The port structure of a containment apparatus according to (1) above, wherein the insertion hole for the fastening member is formed in the rim portion of the port formation hole of the transparent synthetic resin sheet.

(5) The port structure of a containment apparatus according to (1) above, wherein a plurality of annular grooves into which O-rings are tightly fitted are formed in an outer peripheral surface of the outer ring member, the annular groove on the inside being made wide.

(6) The port structure of a containment apparatus according to (1) above, wherein a recessed groove into which a retainer ring is fitted is formed in an inner peripheral surface of the inner ring member.

(7) A kit for creating the port structure of a containment apparatus according to any of (1) to (6) above, the kit having at least: a pattern sheet for forming the port formation hole in the transparent synthetic resin sheet; the inner ring member; the outer ring member; and the fastening member.

(8) A containment apparatus having the port structure of a containment apparatus according to any of (1) to (6) above, wherein a bag-like transparent synthetic resin sheet is stretched.

Advantageous Effects of Invention

The structure according the present invention described above forms a port by forming the port formation hole in the transparent synthetic resin sheet, disposing the inner ring member and the outer ring member in such a manner as to hold the rim of the port formation hole therebetween, and joining these members together using the fastening member. Therefore, a port of any size can easily be formed at any position anywhere even on site, regardless of the material and thickness of the transparent synthetic resin sheet. Furthermore, since the structure joins the inner ring member and the outer ring member to each other with the fastening member, with the rim portion of the port formation hole held between these members, a highly reliable port that can maintain high airtightness can be provided. In addition, the both members can easily be disengaged from each other by loosening the fastening member and removing the screws from the nuts, enabling reuse of the port structural member.

DESCRIPTION OF EMBODIMENTS

A port structure of a containment apparatus according to the present invention, a kit for creating a port of a containment apparatus, and a containment apparatus, are described hereinafter in detail with reference to the drawings.

Figure 1:
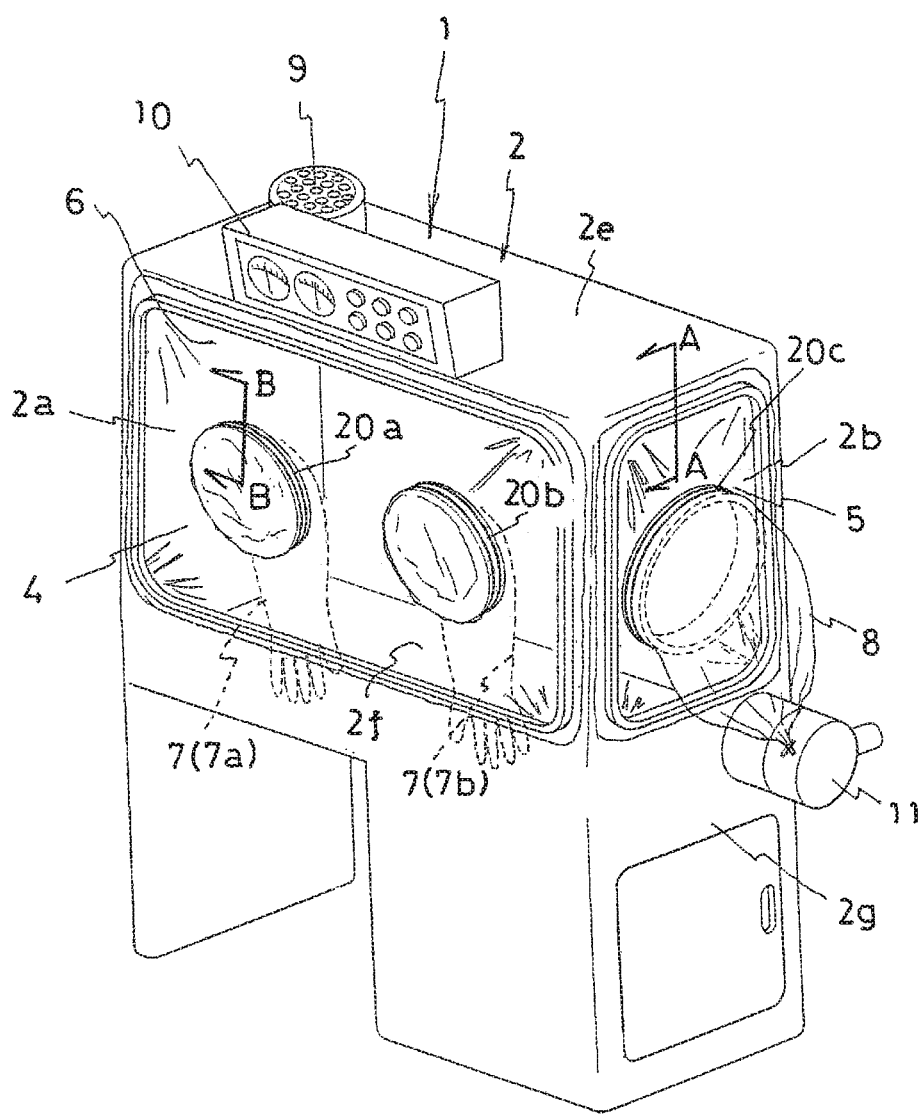
FIG. 1 is a perspective view schematically showing a glove box as an example of a containment apparatus.

A containment apparatus 1 shown in FIG. 1 is configured by a box-shaped frame 2 composed of a stainless steel plate or the like.

Figure 2:
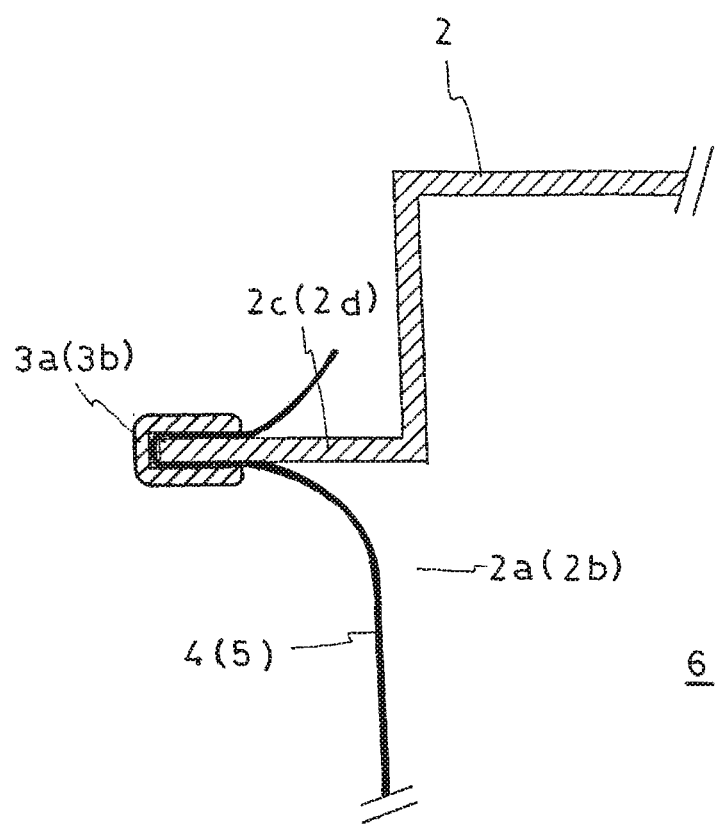
FIG. 2 is an enlarged cross-sectional view of a part taken along line A-A of FIG. 1.

In the frame 2 of the containment apparatus 1, openings 2a, 2b are formed over substantially the entire surfaces of a front surface and one of side surfaces. Also, as shown in FIG. 2, projections 2c (2d) are formed over substantially the entire peripheries of end portions of these openings 2a (2b), and transparent synthetic resin sheets 4 (5) are provided in a stretched manner so as to cover the openings and are fixed by clips 3a (3b) having a C-shaped cross sectional shape. Furthermore, a chamber 6 is defined by a ceiling plate 2e and a bottom plate 2f of the frame 2, the transparent synthetic resin sheet 4 on the front surface, the transparent synthetic resin sheet 5 on the side surface, and the like.

Examples of the material of the transparent synthetic resin sheets 4, 5 include nylon, polyethylene, polypropylene, soft polyvinyl chloride, Eva resin (ethylene/vinyl acetate copolymer), and a laminate of nylon and polyethylene (when stretched in the containment apparatus 1, the polyethylene is configured as an inner surface). Of these materials, soft polyvinyl chloride is favorably used due to the excellent chemical resistance thereof. The thickness of the transparent synthetic resin sheets 4, 5 varies depending on the synthetic resin used, but the thickness is preferably 100 to 1000 μm.

Two ports 20a, 20b are formed in the transparent synthetic resin sheet 4 provided in a stretched manner in the front surface. One port 20c is formed in the transparent synthetic resin sheet 5 provided in a stretched manner in the side surface. An arm glove 7 (7a, 7b) made of synthetic rubber such as Hypalon (chlorosulfonated polyethylene) is attached to each of the two ports 20a, 20b formed in the front surface. A containment bag 8 made of soft synthetic resin is attached to the one port 20c formed in the side surface. The chamber 6 is sealed by the arm gloves 7 and the containment bag 8.

An intake air filter portion 9 and an operation board 10 are installed on the ceiling plate 2e of the frame 2. An exhaust filter portion 11 is installed on a side plate 2g of the frame 2. Moreover, although not shown, a device such as a grinder or a mixer is installed in the sealed chamber 6.

Figure 3:
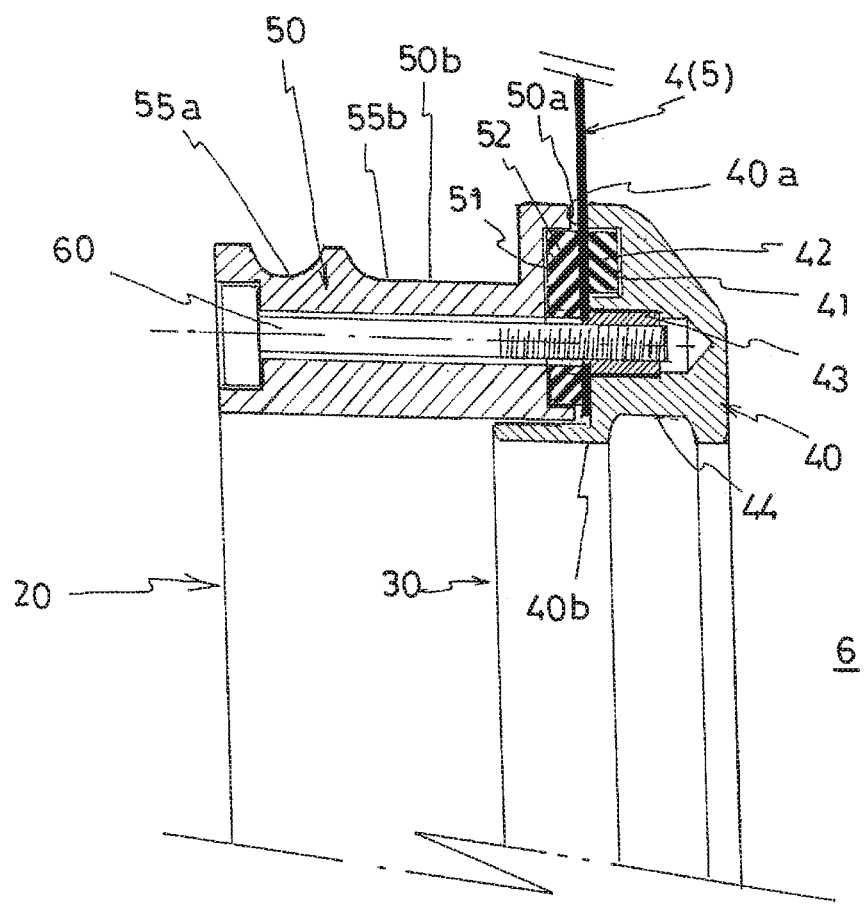
FIG. 3 is an enlarged cross-sectional view of a part taken along line B-B of FIG. 1.
Figure 4:
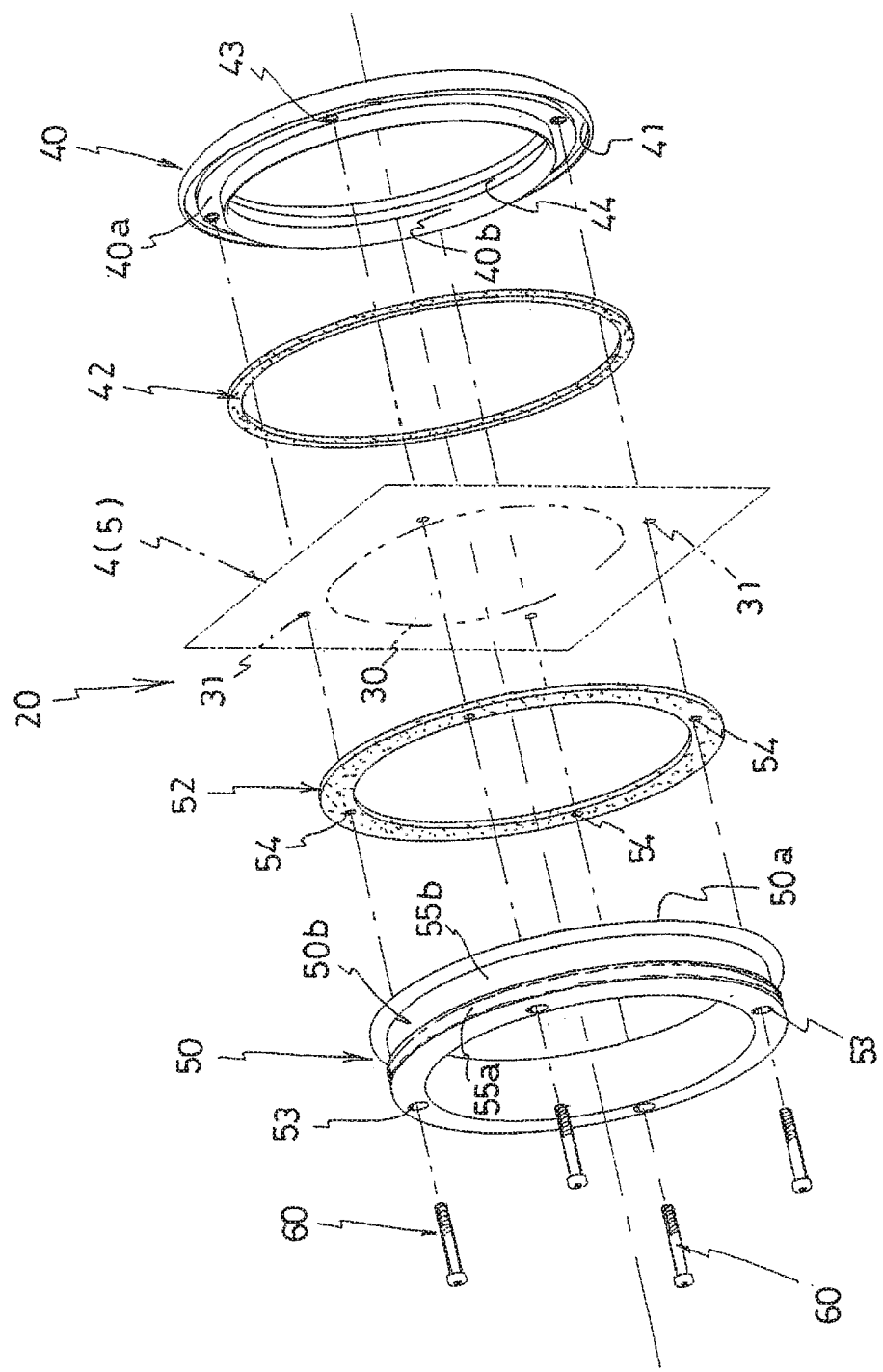
FIG. 4 is an exploded perspective view showing a port structure according to the present invention.

The port 20 (20a, 20b, 20c) is structured as shown in FIGS. 3 and 4. Specifically, the port 20 is structured by a port formation hole 30 formed in the transparent synthetic resin sheet 4 (or 5), an inner ring member 40 disposed on the inner surface side of the port formation hole 30, an outer ring member 50 disposed on the outer surface side of the port formation hole 30, and screws 60 configuring fastening members for joining the inner ring member 40 and the outer ring member 50 while having a rim portion of the port formation hole 30 held between these members 40, 50. Note that the inner ring member 40 and the outer ring member 50 preferably each have a circular or oval cross-sectional shape. Particularly for an arm glove port, a wide range of motion of the glove can be obtained by vertically disposing an oval port.

Figure 5:
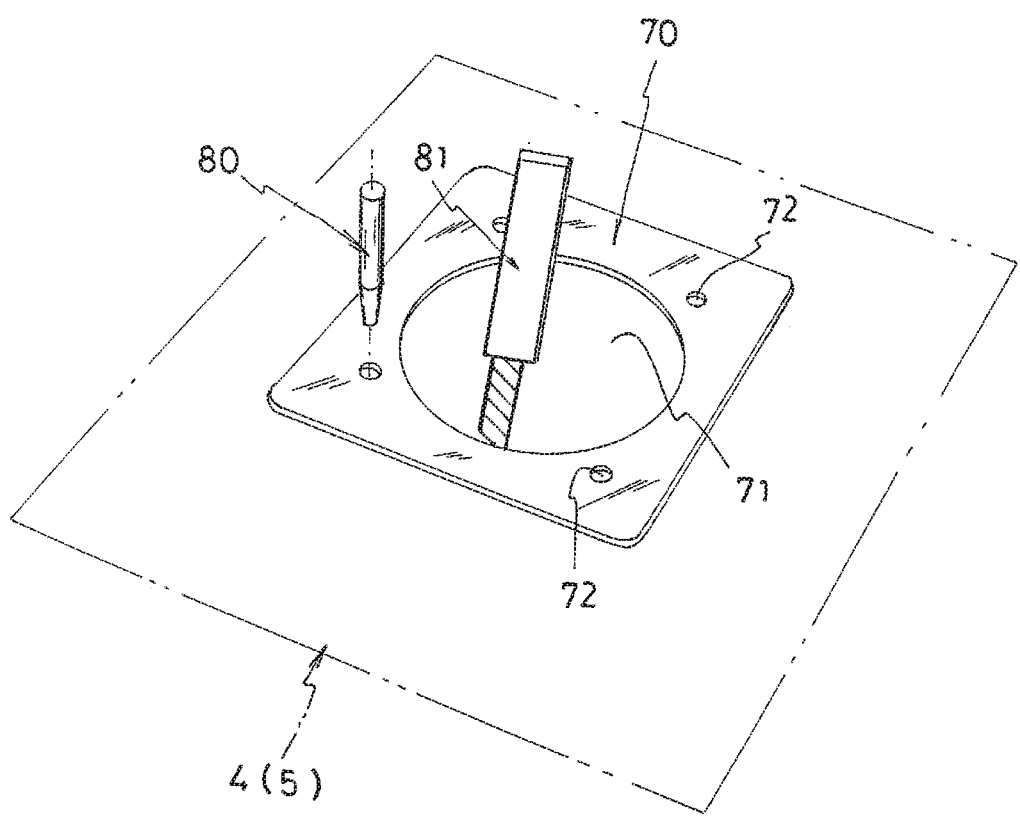
FIG. 5 is a schematic perspective view showing an example of an operation for forming a port formation hole in a transparent synthetic resin sheet.

It is preferred that a screw insertion hole 31 be formed together with the port formation hole 30 in the transparent synthetic resin sheet 4 (or 5). The number of screw insertion holes 31 depends on the size of the port formation hole but is preferably six for the arm glove port and six or more for a containment bag hole. Note that the number of screw insertion holes 31 may be four for a relatively small hole diameter of the port formation hole used for handling a filter, for attaching a washing nozzle, and for attaching a hook or the like, as described hereinafter. It is preferred that the port formation hole 30 and the like be formed using a pattern sheet 70 shown in FIG. 5. The pattern sheet 70 shown in FIG. 5 has formed therein a large-diameter through hole 71 having substantially the same hole diameter as the port formation hole 30 to be formed on a plate surface of the pattern sheet 70, and a plurality of (four in the illustrated embodiment) small-diameter through holes 72 having substantially the same hole diameter as the screw insertion holes 31 to be formed in a rim portion of the plate surface. The small-diameter through holes 72 are formed at equal intervals in a circumferential direction along an imaginary circle concentric with the large-diameter through hole 71. Then, this pattern sheet 70 is placed in an appropriate position on the transparent synthetic resin sheet 4 (or 5) and the screw insertion holes 31 are formed using a punch 80. On the other hand, the port formation hole 30 is formed by cutting the pattern sheet 70 along the large-diameter through hole 71 by using a cutter 81 or the like. In this manner, the port formation hole 30 and the screw insertion holes 31 can easily be formed at any position in the transparent synthetic resin sheet 4 (or 5).

Any material can be used for the pattern sheet 70 as long as the material cannot easily be cut using a cutter or the like; the pattern sheet 70 may be made of various synthetic resins, metals, or the like. Note that the pattern sheet 70 is preferably made of synthetic resin (e.g., polytetrafluoroethylene).

When performing the foregoing operation using a punch or a cutter, it is preferred that a patch be placed on the back side of the transparent synthetic resin sheet 4.

In addition, the diameter of the port formation hole 30 to be formed in the transparent synthetic resin sheet 4 (or 5) is preferably substantially equal to the diameter of an inner peripheral surface (=inner diameter) of the outer ring member 50. In a case where the diameter of the port formation hole 30 is smaller than this inner diameter, wrinkles are likely to be formed in the synthetic resin sheet 4 (or 5) when the synthetic resin sheet 4 (or 5) is held between the inner peripheral surface of the outer ring member 50 and an outer peripheral surface of an L-shaped portion of the inner ring member 40 that faces the inner peripheral surface of the outer ring member 50, depending on the thickness or slipperiness of the synthetic resin sheet 4 (or 5), the L-shaped portion of the inner ring member 40 being described hereinafter. Moreover, the adhesion between the members 40, 50 becomes impaired, bringing about the possibility that high airtightness cannot be maintained.

As shown in FIG. 3, the inner ring member 40 has a substantially L-shaped cross section in which a cylindrical member extends in an axial direction at one end of an inner peripheral surface thereof. Then, this L-shaped portion is formed to have the shape/size so as to allow the outer ring member 50 to be externally fitted (loosely fitted) thereto. Since the inner ring member 40 and the outer ring member 50 are structured to be so-called faucet-joined to each other, these members can be fitted to each other easily. An annular groove 41 is formed in a holding surface 40a of the inner ring member 40. Furthermore, a ring-shaped seal member 42 that is slightly thicker than the depth of the annular groove 41 is disposed in the annular groove 41. In addition, nuts (insert nuts) 43 into which the screws are threaded are embedded in appropriate positions on the holding surface 40a (positions that are spaced 90 degrees apart, in the illustrated embodiment). A recessed groove 44 into which a retainer ring is fitted is formed in an inner peripheral surface 40b of the inner ring member 40, the retainer ring not being shown in FIGS. 3 and 4.

An annular groove 51 that is wider than the one formed in the inner ring member 40 is formed in a holding surface 50a of the outer ring member 50. Then, a ring-shaped seal member 52 that is slightly thicker than the depth of the annular groove 51 is disposed in the annular groove 51. Screw insertion holes 53 are formed at appropriate positions on the holding surface 50a (positions that are spaced 90 degrees apart, in the illustrated embodiment). Then, screw insertion holes 54 communicating with the screw insertion holes 53 are also formed in the ring-shaped seal member 52 to be disposed. Two annular grooves 55a, 55b into which O-rings are tightly fitted are formed in the outer peripheral surface 50b of the outer ring member 50, wherein the width of the annular groove 55b on the inside (on the transparent synthetic resin sheet 4 side) is more than twice as great as the width of the annular groove 55a on the outside.

It is preferred that the materials of the inner ring member 40 and the outer ring member 50 be various synthetic resins such as high density polyethylene (HDPE) and tetrafluoroethylene. However, the materials of the inner ring member 40 and the outer ring member 50 may include metals such as stainless steel. In addition, it is preferred that the materials of the ring-shaped seal members 42, 52 be synthetic rubbers having elasticity, weather resistance, and abrasion resistance, such as ethylene propylene rubber (EPDM).

The rim portion of the port formation hole 30 formed in the transparent synthetic resin sheet 4 (or 5) is held between the inner ring member 40 and the outer ring member 50, and these members 40, 50 are joined to each other by the screws 60 functioning as the fastening members, to form the port 20.

More specifically, the inner ring member 40 is placed on the chamber 6 side, with the transparent synthetic resin sheet 4 (or 5) therebetween, and the outer ring member 50 is placed on the outside of the chamber 6. The L-shaped portion of the inner ring member 40 is inserted through the port formation hole 30, and the members 40, 50 are pressed against each other in such a manner as to hold the transparent synthetic resin sheet 4 therebetween from the front side and the back side, until the outer ring member 50 is externally fitted to the L-shaped portion of the inner ring member 40. The screw insertion holes 53 formed in the outer ring member 50 are aligned with the nuts 43 embedded in the inner ring member 40. In so doing, in a case where the screw insertion holes 31 are formed in the synthetic resin sheet 4 (or 5), the positions of the screw insertion holes 31 are aligned with the positions of the screw insertion holes 53 of the outer ring member 50 and the positions of the nuts 43 of the inner ring member 40. Subsequently, the screws 60 are inserted through the screw insertion holes 53 formed in the outer ring member 50, and the screws 60 are threaded into the nuts 43 embedded in the inner ring member 40, thereby joining the members 40, 50 to each other.

Although the both members 40, 50 are joined to each other by means of the combination of the screws 60 and the nuts 43, other methods may be used, such as a method using, for example, a clamp. Moreover, although depending on the thickness or slipperiness of the transparent synthetic resin sheet 4 (or 5) used, in some cases the screw insertion holes 31 do not need to be formed in this transparent synthetic resin sheet in advance when screws with pointy tips or screws with drill blades at the tips are used as the screws 60.

Since the port 20 that is formed in the manner described above has the structure in which, as shown in FIG. 3, the inner ring member 40 and the outer ring member 50 are joined to each other by the screws 60, with an opening edge of the port formation hole 30 of the transparent synthetic resin sheet 4 (or 5) being held therebetween, an excellent sealed condition can be maintained. In addition, there is no risk that the port 20 attached to the containment apparatus 1 becomes removed from the transparent synthetic resin sheet 4 (or 5) during an operation in the containment apparatus 1, resulting in achieving a highly reliable port. According to the tests conducted by the applicants of the present invention, even when the pressure in the chamber 6 was increased to a high pressure of 6000 Pa, the airtightness was maintained in the abovementioned port structure, and even after an insertion/retraction motion in which an arm is taken in and out of the arm glove attached to the port is performed two hundred times or more under a negative pressure of −600 Pa, removal of the port and the like were not observed at all. In the port disclosed in PTL 2, on the other hand, shifting occurred after one hundred insertion/retraction motions (the transparent synthetic resin sheet held between the inner cylindrical member and the outer cylindrical member was displaced).

Figure 6:
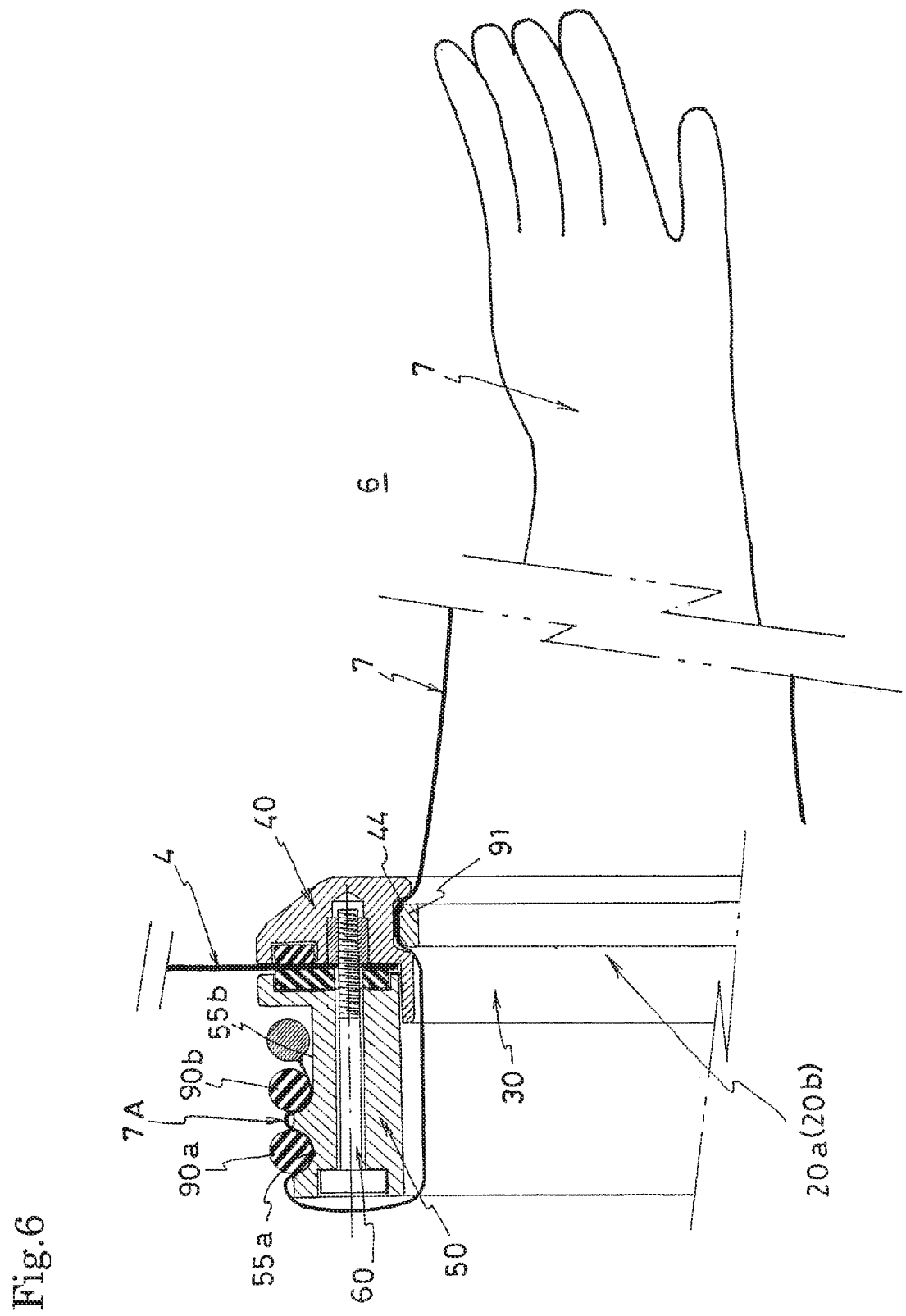
FIG. 6 is a diagram showing a structure in which an arm glove is attached to a port.

The arm glove 7 (7a, 7b) is attached to each of the ports 20a, 20b. As shown in FIG. 6, the arm glove 7 is attached by holding a base opening portion 7A thereof between O-rings 90a, 90b in the annular grooves 55a, 55b formed in the outer peripheral surface of the outer ring member 50 and then fitting a retainer ring 91 into the recessed groove 44 formed in the inner peripheral surface of the inner ring member 40, the retainer ring 91 being inserted into the arm glove 7.

Figure 7:
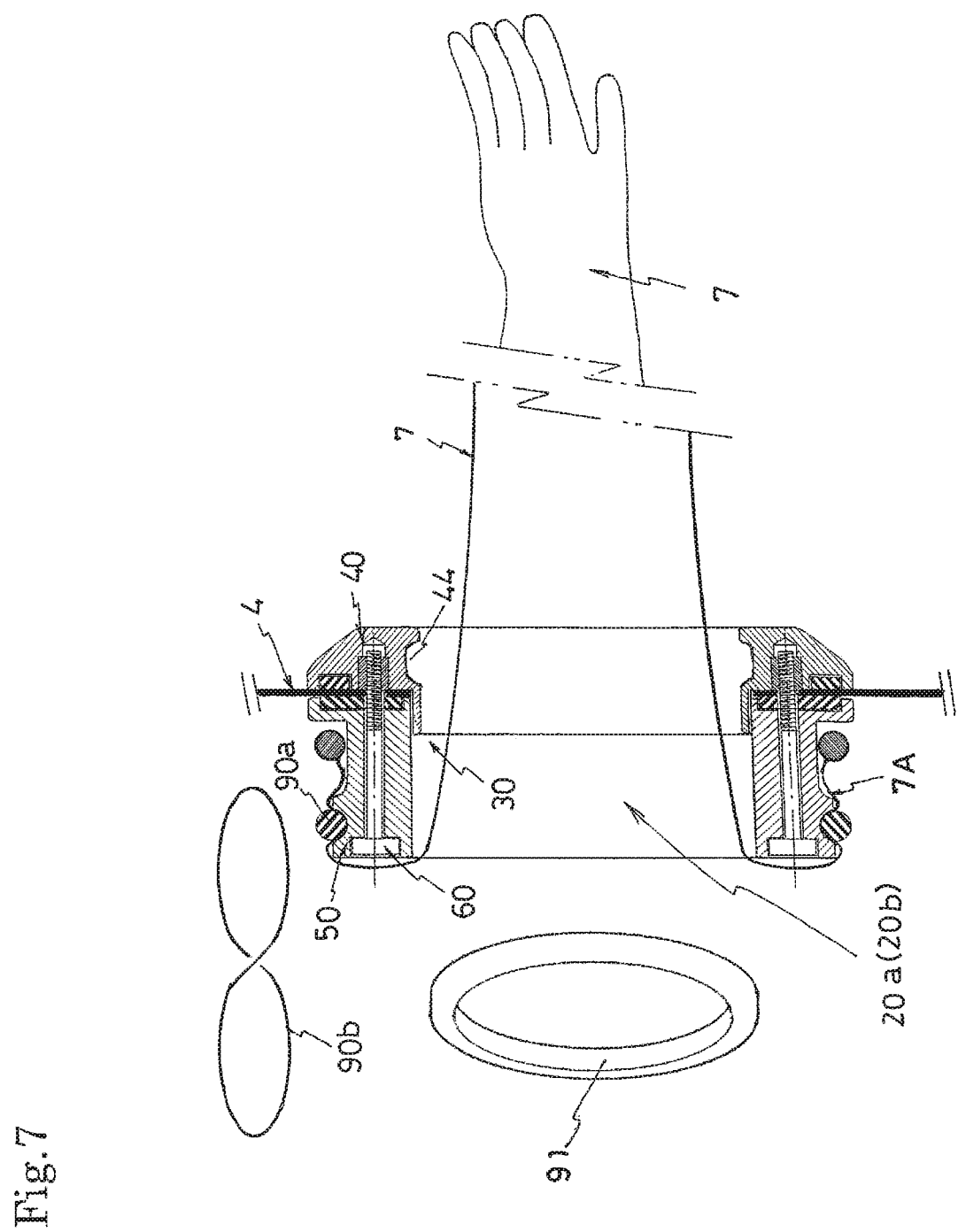
FIG. 7 is a diagram showing a procedure for replacing the arm glove attached to the port.
Figure 8:
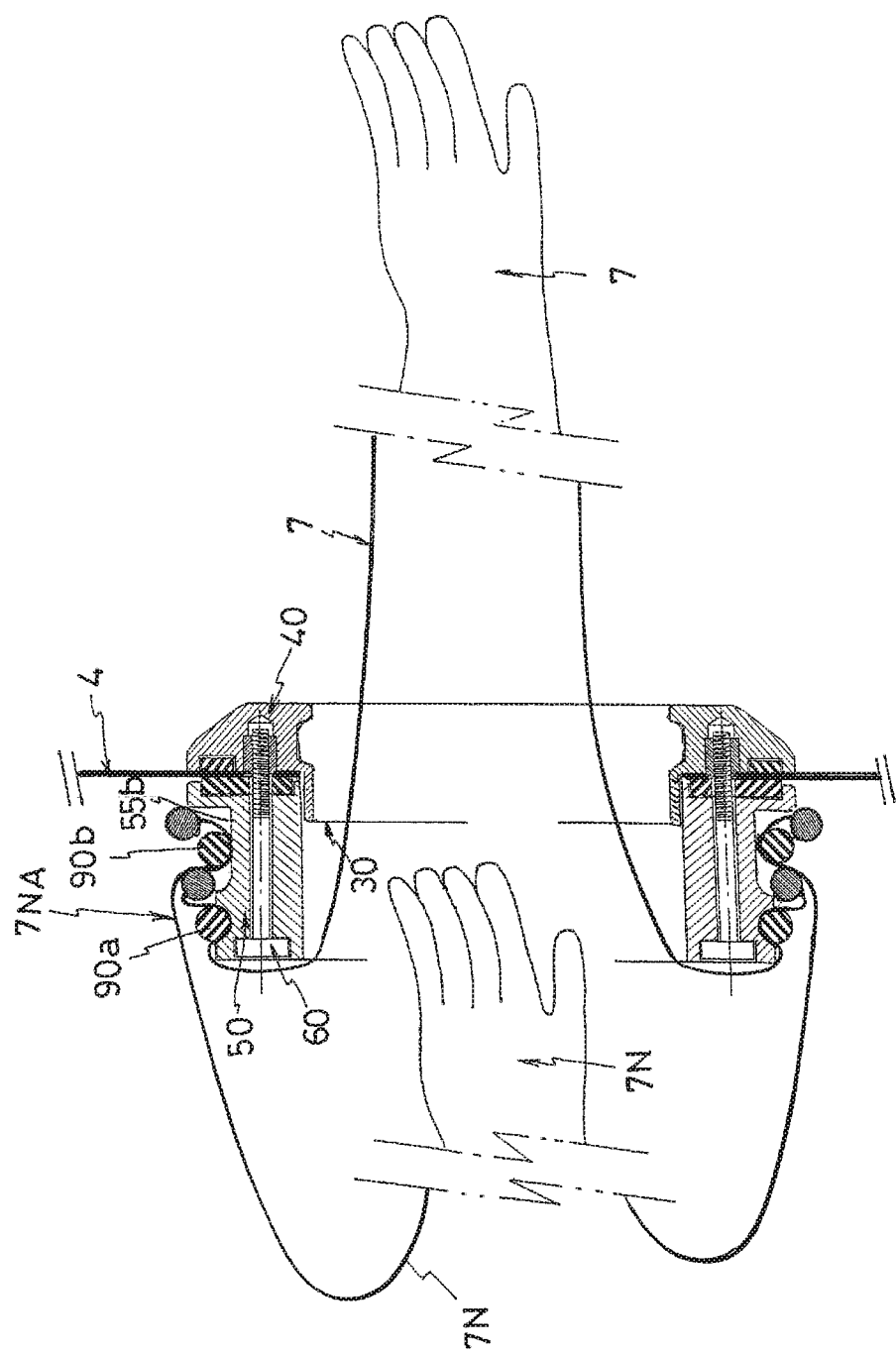
FIG. 8 is a diagram showing the procedure for replacing the arm glove attached to the port.
Figure 9:
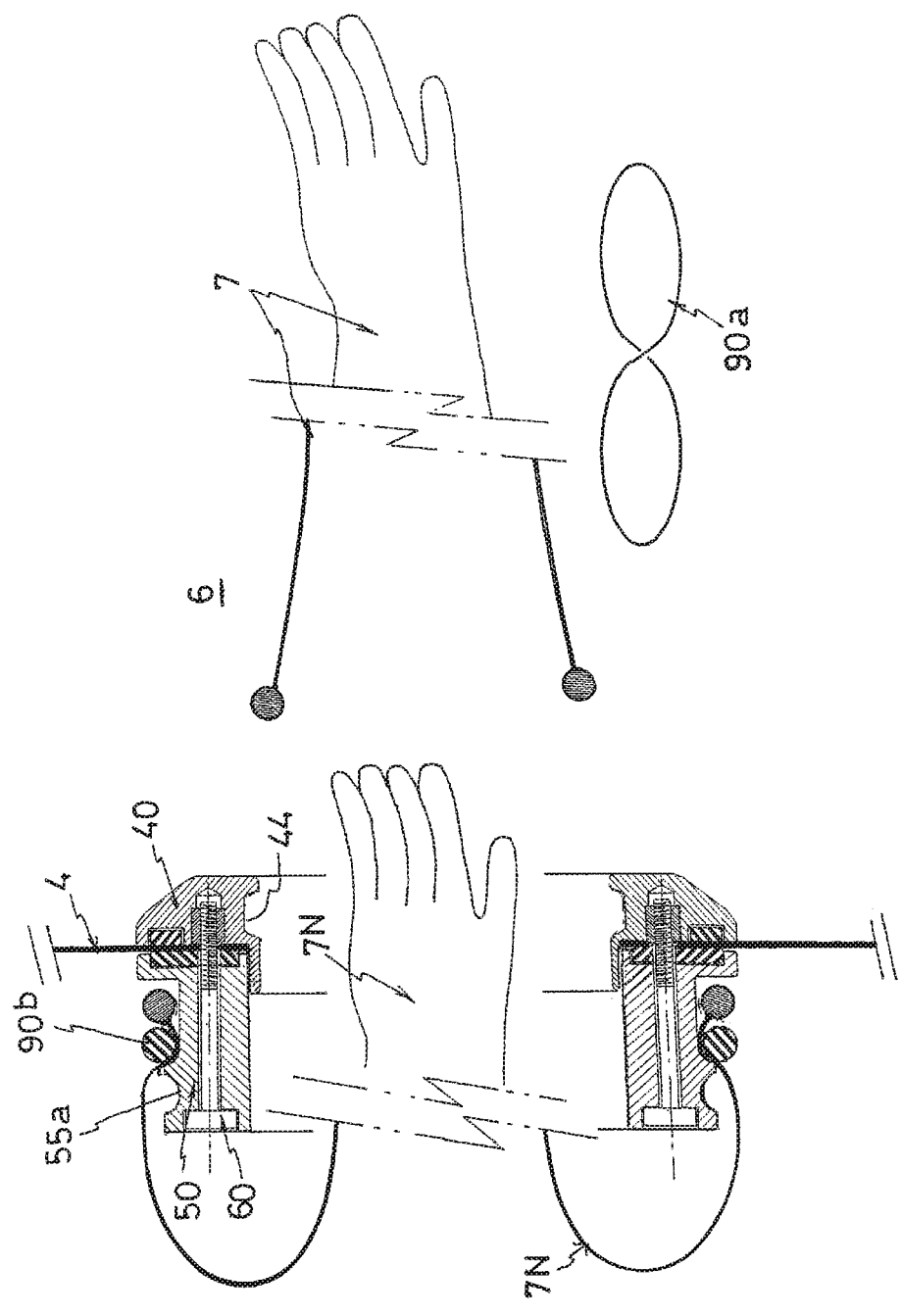
FIG. 9 is a diagram showing the procedure for replacing the arm glove attached to the port.

When replacing the arm glove 7, as shown in FIG. 7, the O-ring 90b on the inside (the transparent synthetic resin sheet 4 side) is removed from the annular groove 55b of the outer ring member 50 and then the retainer ring 91 is removed from the recessed groove 44 of the inner ring member 40 and pulled out of the arm glove 7. Subsequently, as shown in FIG. 8, a base opening portion 7NA of a new arm glove 7N is held by the O-ring 90b by using the wide annular groove 55b of the outer ring member 50. Next, as shown in FIG. 9, the O-ring 90a is removed from the annular groove 55a of the outer ring member 50, and the previous arm glove 7 is removed.

The arm glove 7 and the O-ring 90a that are removed from the outer ring member 50 remain in the chamber 6 but are ejected to the outside of the apparatus through the containment bag 8 and the like, operating methods of which are described hereinafter. Then, the new arm glove 7N can be returned to the initial installation state thereof by tightly fitting another O-ring 90N (not shown) into the annular groove 55a, placing the retainer ring 91, which is removed previously, into the arm glove 7N, and fitting the retainer ring 91 into the recessed groove 44 of the inner ring member 40.

To the port 20c, on the other hand, the containment bag 8 is attached. The port 20c, too, is formed in the transparent synthetic resin sheet 5 by means of the same structure as that of the ports 20a, 20b of the arm glove 7. However, difference is that port 20c is formed to have a diameter larger than the diameters of the ports 20a, 20b of the arm glove 7.

The containment bag (soft synthetic resin member) 8 is attached to this port 20c by holding an opening edge 8A of the containment bag 8 between the O-rings 90a, 90b in the annular grooves 55*a*, 55*b* formed in the outer peripheral surface of the outer ring member 50.

Figure 10:
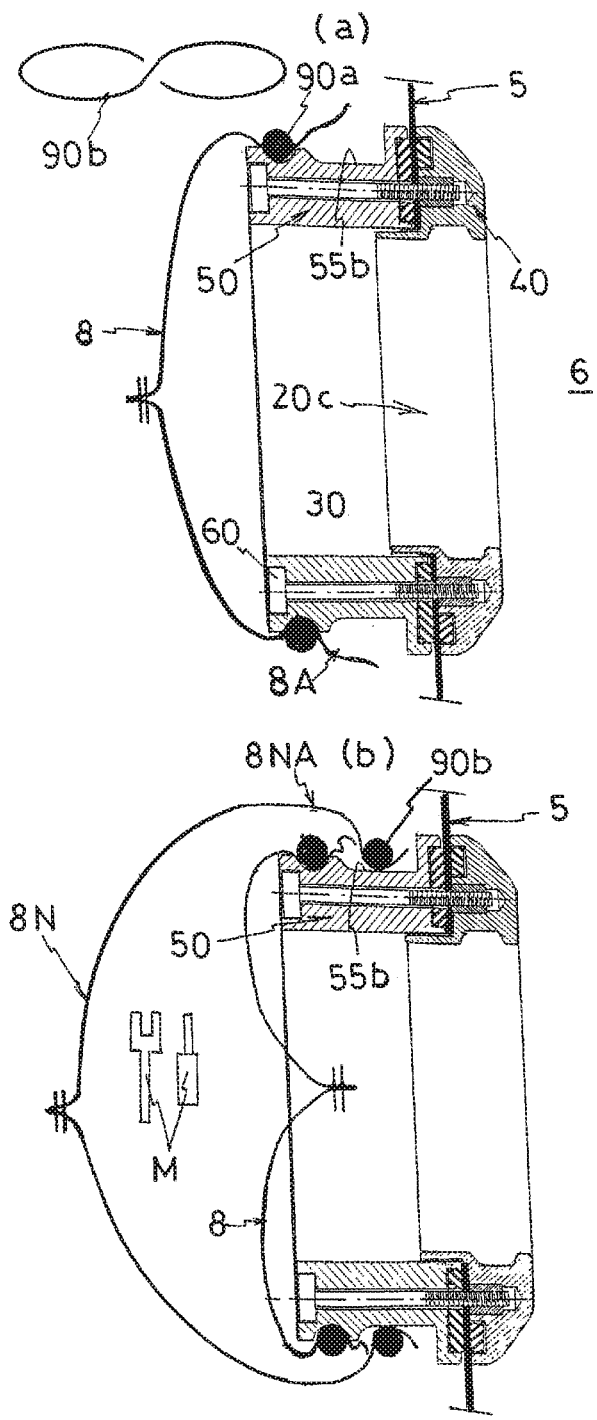
FIG. 10 is a diagram showing a procedure for replacing an internal part and the like using a containment bag attached to the port.
Figure 11:
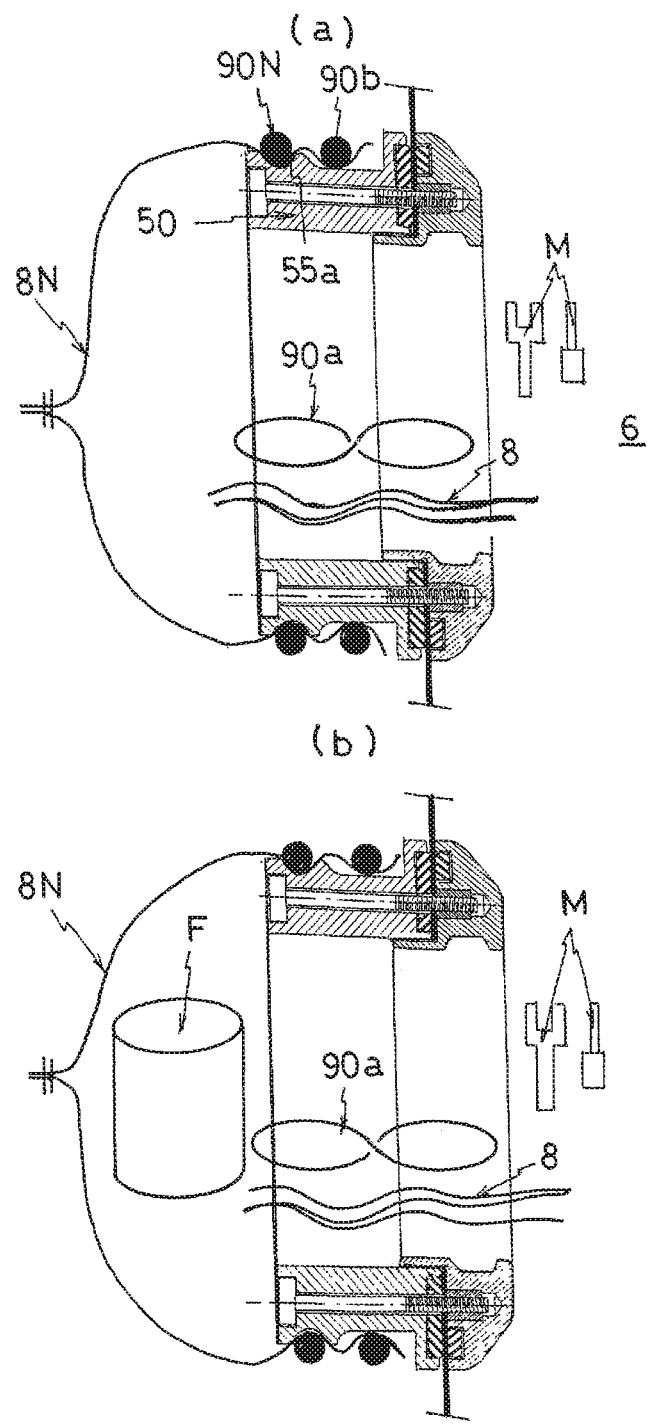
FIG. 11 is a diagram showing the procedure for replacing an internal part and the like using the containment bag attached to the port.
Figure 12:
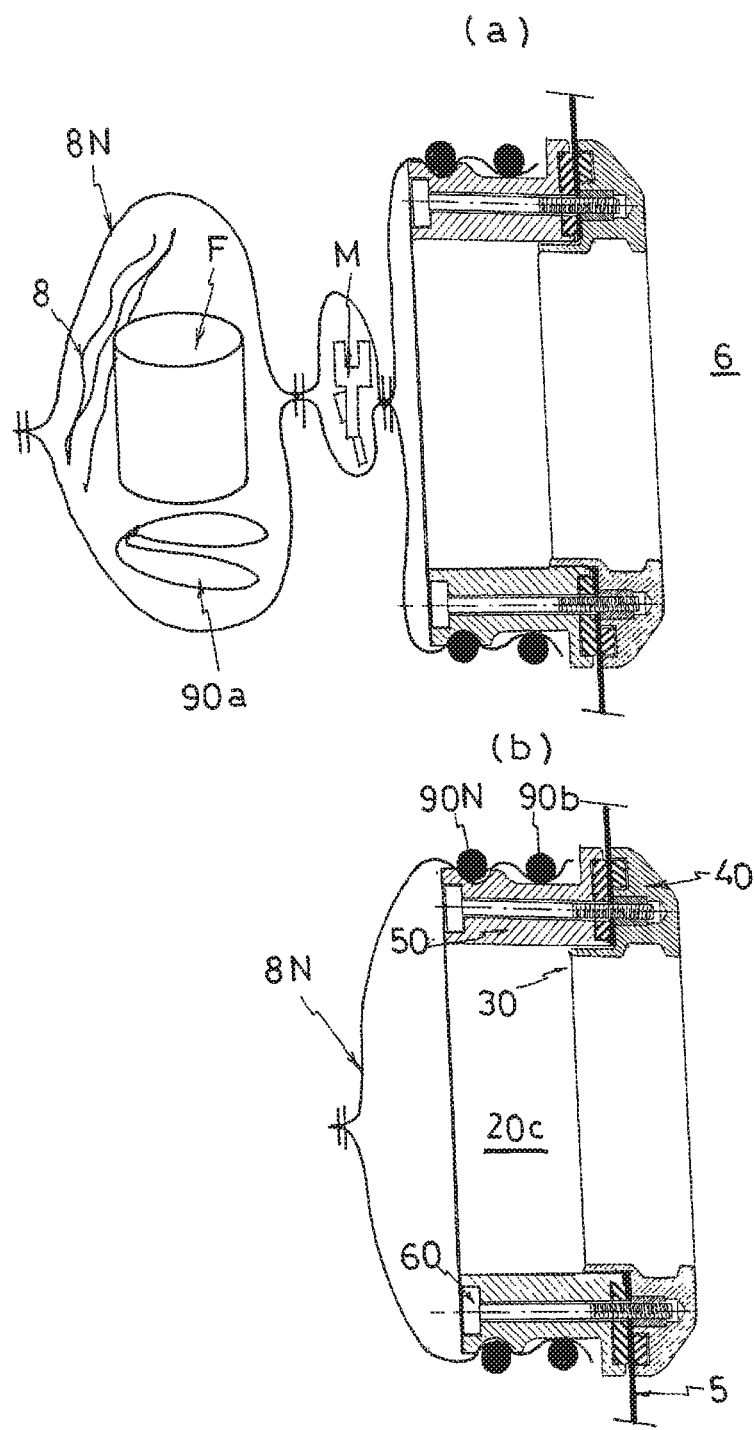
FIG. 12 is a diagram showing the procedure for replacing an internal part and the like using the containment bag attached to the port.

Next is described, with reference to FIGS. 10 to 12, an example of an operation procedure for taking replacement parts such as filters, tools, and the like of, for example, a grinder (not shown) in and out through the port 20*c* of the transparent synthetic resin sheet 5 onto which the aforementioned containment bag 8 is mounted, the grinder being installed in the chamber 6.

As shown in FIG. 10(*a*), first of all, the O-ring 90*b* on the inside (the transparent synthetic resin sheet 5 side) is removed from the annular groove 55*b* of the outer ring member 50. From this state, as shown in FIG. 10(*b*), an opening edge 8NA of a new containment bag 8N housing a tool M is held by the O-ring 90*b* in the annular groove 55*b* of the outer ring member 50. Next, as shown in FIG. 11(*a*), the O-ring 90*a* is removed from the annular groove 55*a* of the outer ring member 50, to remove the previous containment bag 8. Thereafter, a new O-ring 90N is tightly fitted into the annular groove 55*a* of the outer ring member 50 to ensure the sealed condition of the new containment bag 8N. Then, on the inside of the chamber 6, a filter is removed using the tool M. Next, as shown in FIG. 11(*b*), the containment bag 8 and the O-ring 90*a* that are removed from the outer ring member 50, the tool M, and a filter F are housed in the containment bag 8N. Subsequently, as shown in FIG. 12(*a*), the filter F, the O-ring 90*a*, and the containment bag 8 that are to be discarded are enclosed separately from the tool M to be reused, and these enclosures are divided with strings, clips or the like and then cut and separated. As a result, the filter F and the like in the chamber 6 that are to be discarded can be removed while keeping the sealed condition. In addition, as shown in FIG. 12(*b*), the port 20*c* is sealed in the new containment bag 8N.

From the perspective of simplifying the aforementioned production of the ports 20 (20*a*, 20*b*, 20*c*), in the present invention, it is preferred that a kit for creating a port of a containment apparatus be formed, the kit being composed at least of the pattern sheet 70 for forming the port formation hole 30 in the transparent synthetic resin sheet 4 (or 5), the inner ring member 40, the outer ring member 50, and the screws 60 configuring the fastening members. Furthermore, the kit for creating a port of a containment apparatus may further include the punch 80 for boring the screw insertion holes 31 in the transparent synthetic resin sheet 4 (or 5), the O-rings 90 for attaching the arm gloves 7 and the containment bags 8 to the ports 20, and the like.

Although the embodiments of the port structure of a containment apparatus according to the present invention have been described above, the present invention is not limited to any of these embodiments. It is obvious that various modifications and changes can be made to the present invention within the scope of the technical ideas described in the claims.

Figure 13:
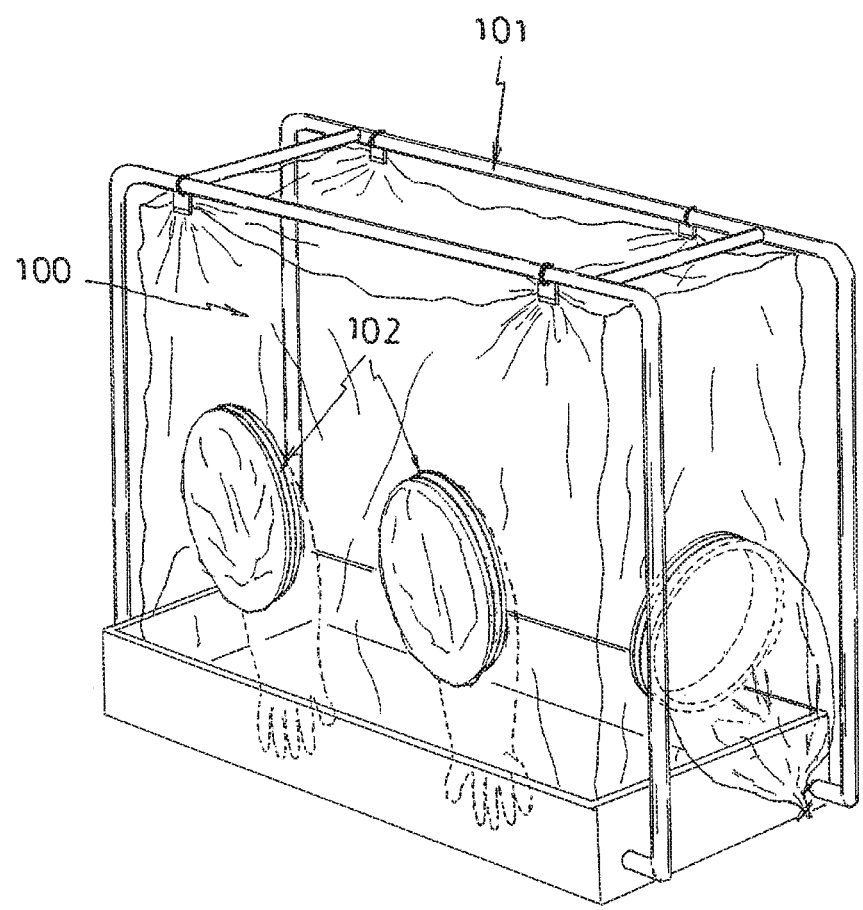
FIG. 13 is a schematic perspective view showing another example of the containment apparatus.

For example, the foregoing embodiments described the containment apparatus in which the transparent synthetic resin sheets are provided in a stretched manner in the openings on the front surface and the like of the frame, but the transparent synthetic resin sheets may each be a simple bag-like sheet for covering substantially a whole instrument to be contained or a whole section of an instrument that needs to be contained. Also, a simple containment apparatus shown in FIG. 13 is also possible in which a bag-like transparent synthetic resin sheet 100 is stretched in a frame 101 formed of pipes. The shape of the ports to be formed do not have to be a circular shape, and therefore oval ports 102 may be formed.

In addition, although the foregoing embodiments described the ports to which the arm gloves and containment bag are attached, the port structure according to the present invention can be adopted for ports for other uses. For example, FIG. 14(*a*) shows a port for a filter. The structure of this port 103 differs from the port structure according to the present invention in that an outer ring member 104 is in the shape of a bottomed cylinder, wherein a bottom portion thereof has a plurality of air vents 105 bored therein, and a filter 106 is provided on the inside. On the other hand, FIG. 14(*b*) shows a port for attaching a washing nozzle. This port 107 differs from the port structure according to the present invention in that an outer ring member 108 is in the shape of a bottomed cylinder, wherein the center of a bottom portion thereof has a hole 109 formed therein, a male screw portion 110*a* formed at an end portion of a washing nozzle 110 is inserted into this hole 109 and fastened to the outer ring member 108 by a nut 110*b*. Moreover, although not shown, this port 107 can also be used as a port for connecting a power cable, by inserting an end portion of a power cable with a plug portion at an end thereof into the hole 109 of the outer ring member 108.

Figure 14:
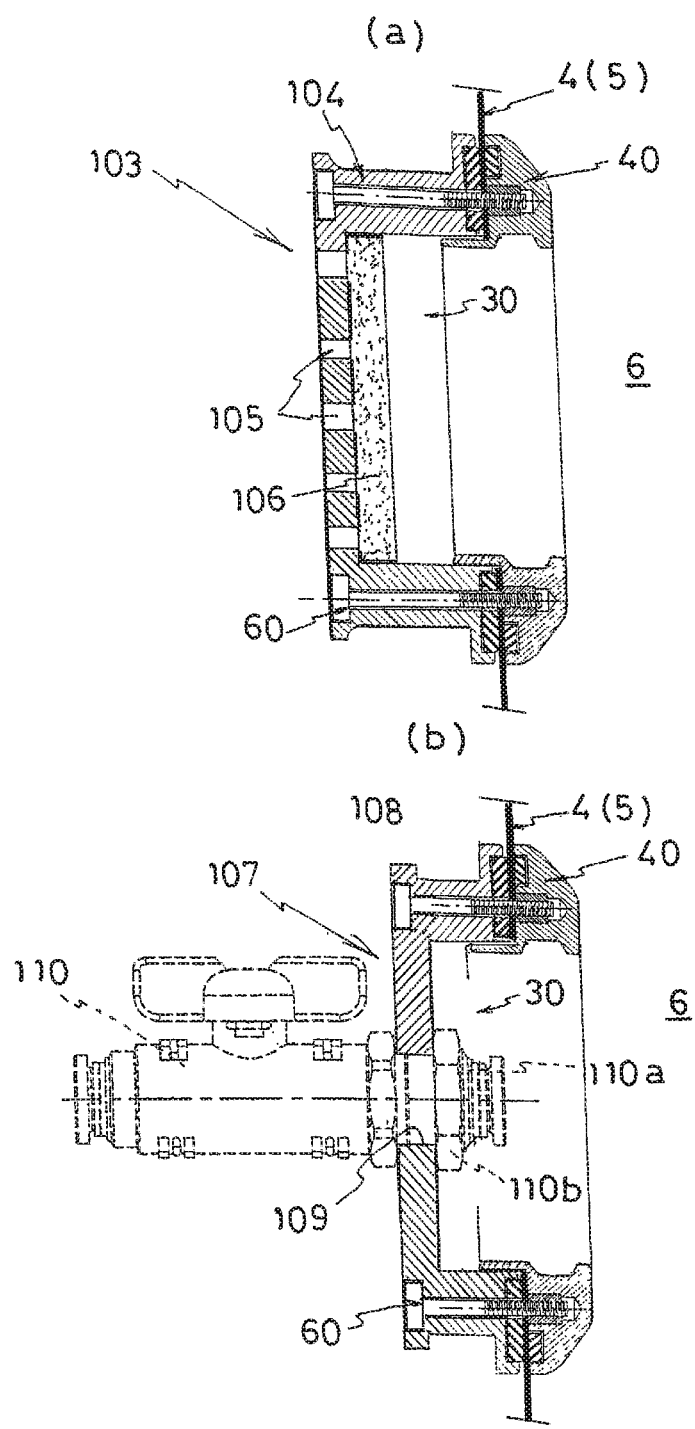
FIG. 14 is a cross-sectional view showing another embodiment of the port structure according to the present invention.

Note that in FIG. 14, the same members and portions as those of the foregoing embodiments are given the same reference numerals and the descriptions thereof are omitted accordingly.

INDUSTRIAL APPLICABILITY

According to the present invention, not only is it possible to form a port of any size in any position anywhere even on site, but also high airtightness thereof can be maintained, providing a highly reliable port. Therefore, the port structure of the present invention can widely be used as the structures of ports of various containment apparatuses.

REFERENCE SIGNS LIST

1 Containment apparatus
2 Frame
2*a*, 2*b* Opening
2*c*, 2*d* Projection
2*e* Ceiling plate
2*f* Bottom plate
2*g* Side plate
3*a*, 3*b* Clip
4, 5 Transparent synthetic resin sheet
6 Chamber
7, 7*a*, 7*b*, 7N Arm glove
7A, 7NA Base opening portion
8, 8N Containment bag
8A, 8NA Opening edge
9 Intake air filter portion
10 Operation board
11 Exhaust filter portion
20, 20*a*, 20*b*, 20*c* Port
30 Port formation hole
31 Screw insertion hole
40 Inner ring member
40*a* Holding surface
40*b* Inner peripheral surface
41 Annular groove
42 Ring-shaped seal member
43 Nut
44 Recessed groove
50 Outer ring member
50*a* Holding surface 50*b* Outer peripheral surface
51 Annular groove
52 Ring-shaped seal member
53, 54 Screw insertion hole
55*a* Annular groove
55*b* Wide annular groove
60 Screw (fastening member)
70 Pattern sheet
71 Large-diameter through hole
72 Small-diameter through hole
80 Punch
81 Cutter
90*a*, 90*b*, 90N O-ring
91 Retainer ring
M Tool
F Filter

The invention claimed is:

1. A port structure of a containment apparatus, comprising:
   a transparent synthetic resin sheet forming a port formation hole therein and defining at least a part of a chamber;
   an inner ring member disposed on an inner surface side of the port formation hole;
   an outer ring member disposed on an outer surface side of the port formation hole; and
   a fastening member that joins the inner ring member and the outer ring member to each other in a state holding a rim portion of the port formation hole therebetween, wherein:
   a plurality of grooves into which an O-ring is tightly fitted are formed in an outer peripheral surface of the outer ring member,
   a width of an inner annular groove of the plurality of grooves is more than twice as great as a width of an outer annular groove of the plurality of grooves, and
   a recessed groove into which a retainer ring is fitted is formed in an inner peripheral surface of the inner ring member.

2. The port structure of a containment apparatus according to claim 1,
   wherein a ring-shaped seal member is provided in each of a holding surface of the inner ring member and a holding surface of the outer ring member.

3. The port structure of a containment apparatus according to claim 1,
   wherein an insertion hole for inserting a screw configuring the fastening member is formed in the outer ring member, and
   wherein the inner ring member is provided with a female screw into which the screw is threaded.

4. The port structure of a containment apparatus according to claim 3,
   wherein the insertion hole for the fastening member is formed in the rim portion of the port formation hole of the transparent synthetic resin sheet.

5. A kit for creating the port structure of a containment apparatus according to claim 1, the kit further comprising
   a pattern sheet for forming the port formation hole in the transparent synthetic resin sheet.

6. A containment apparatus having the port structure of a containment apparatus according to claim 1,
   wherein the transparent synthetic resin sheet is stretched.

* * * * *